(12) United States Patent  
Hair et al.

(10) Patent No.: US 9,155,395 B2  
(45) Date of Patent: Oct. 13, 2015

(54) COLLAPSIBLE ARM SUPPORT

(71) Applicant: RePoser, Inc., Cary, NC (US)

(72) Inventors: John Hunter Hair, Cary, NC (US); Donald Sentman Aikin, Wake Forest, NC (US); Daniel Carmine Fuccella, Cary, NC (US); Allen Wendell Moore, Cary, NC (US); Jordan Robert Long, Durham, NC (US); Nathan James Metty, McLeansville, NC (US)

(73) Assignee: REPOSER, INC., Cary, NC (US)

( * ) Notice: Subject to any disclaimer, the term of this patent is extended or adjusted under 35 U.S.C. 154(b) by 0 days.

(21) Appl. No.: 14/269,653

(22) Filed: May 5, 2014

(65) Prior Publication Data

US 2014/0339877 A1  Nov. 20, 2014

Related U.S. Application Data

(60) Provisional application No. 61/823,956, filed on May 16, 2013.

(51) Int. Cl.
*A47C 7/54* (2006.01)
*B64D 11/06* (2006.01)

(52) U.S. Cl.
CPC ............. *A47C 7/546* (2013.01); *B64D 11/0644* (2014.12)

(58) Field of Classification Search
CPC .......... B64D 11/06; A47C 7/54; A47C 7/543; A61G 5/14; A47B 3/00; A47B 3/08; A47B 2003/145
USPC ............... 297/411.32, 411.23, 188.18, 188.2, 297/148, 153, 174 R; 108/166, 169, 173, 108/174, 178; 248/441.1, 45–457, 460, 462
See application file for complete search history.

(56) References Cited

U.S. PATENT DOCUMENTS

| | | | | |
|---|---|---|---|---|
| 2,563,347 A | * | 8/1951 | Long | 297/149 |
| 2,709,631 A | * | 5/1955 | Covucci | 108/36 |
| 5,067,417 A | * | 11/1991 | Marmentini et al. | 108/36 |
| 5,106,156 A | * | 4/1992 | Marquis | 297/153 |
| 5,255,612 A | * | 10/1993 | Anderson | 108/43 |
| 5,437,493 A | * | 8/1995 | Weisleder | 297/150 |
| 6,000,345 A | * | 12/1999 | Gillotti | 108/36 |
| 6,044,758 A | * | 4/2000 | Drake | 100/43 |
| 6,170,405 B1 | * | 1/2001 | Weitzman et al. | 108/25 |
| 6,513,443 B2 | * | 2/2003 | Todd | 108/115 |
| 7,278,515 B2 | * | 10/2007 | Moser et al. | 182/152 |
| 7,364,129 B1 | * | 4/2008 | Levari, Jr. | 248/460 |

* cited by examiner

*Primary Examiner* — Beth Stephan
(74) *Attorney, Agent, or Firm* — Coats & Bennett, PLLC

(57) ABSTRACT

A collapsible arm support device and/or method of providing the same. The arm support device is changeable between a collapsed configuration and a deployed (expanded) configuration. The device, when placed between arms of a seat in the deployed configuration provides a comfortable and convenient support for the users arms. The device is advantageously portable.

19 Claims, 6 Drawing Sheets

COLLAPSIBLE ARM SUPPORT

This application claims benefit of U.S. Provisional Application No. 61/823,956, filed 16 May 2013, the entire disclosure of which is incorporated herein by reference.

BACKGROUND

This application is related to collapsible arm and/or head rests for seats, such as airplane seats.

Sitting in seats for extended periods of time can be unpleasant for many people. One commonly uncomfortable situation is being in an airplane seat for an extended period of time. People in such situations often want to simply put their head down and rest, but there is not a convenient and comfortable way to do so. For example, a person may deploy a tray (or "tray table") built into either the seat itself or more typically the seat in front, and bend over to put their arms on the tray, and their head on their crossed arms. However, the trays are typically positioned so that doing so requires bending to an uncomfortable extent. Similar situations may arise in other settings.

As such, there remains a need for devices that provide more convenient and comfortable support for resting arms and/or heads when sitting in a seat. Such devices would advantageously be collapsible and portable, so as to be able to be easily carried from one seat to another, such as for seats on different airplanes.

SUMMARY

The present invention provides a collapsible arm support device and/or a method of providing the same. The arm support device is changeable between a collapsed configuration and a deployed (expanded) configuration. The device, when placed between arms of a seat in the deployed configuration provides a comfortable and convenient support for the users arms. The device is advantageously portable.

In one or more embodiments, the present invention is a method of providing an arm rest. The method includes changing a collapsible arm support device from a collapsed configuration to a deployed configuration, and thereafter, releasably bracing the arm support device against left and right arms of a seat. The arm support device comprises a left platform moveably connected to a right platform; and a left support frame moveably connected to a right support frame, with the left and right support frames each having at least one notch on an outboard end thereof; and a left leg pivotally mounted to at least one of the left platform and the left support frame; and a right leg pivotally mounted to at least one of the right platform and the right support frame. When the device is in the collapsed configuration: a) the left and right platforms are substantially parallel; b) the left and right support frames are substantially parallel; c) the left leg is substantially parallel to the left platform; and d) the right leg is substantially parallel to the right platform. When the device is in the deployed configuration: a) the left and right platforms are substantially parallel; b) the left and right support frames are disposed transverse to each other at a non-zero angle; c) the left leg is disposed transverse to the left platform and the left support frame and extends between the left platform and the left support frame so as to space outboard portions of the left platform and the left support frame from each other; d) the right leg is disposed transverse to the right platform and the right support frame and extends between the right platform and the right support frame so as to space outboard portions of the right platform and right support frame from each other. The step of bracing the arm support device includes engaging the notches of the left and right support frame against the left and right arms of the seat, respectively.

For some embodiments, the method may be such that changing the collapsible arm support device from the collapsed configuration to the deployed configuration comprises rotating the right support frame relative to the left support frame through an arc greater than 90°. The left support frame may have two notches on the outboard end thereof spaced from each other, and the right support frame may have two notches on the outboard end thereof spaced from each other, and the step of bracing the arm support device may comprise: a) engaging the two notches of the left support frame against the left arms of the seat; and b) engaging the two notches of the right support frame against the right arms of the seat. The changing of the collapsible arm support device from the collapsed configuration to the deployed configuration may comprise: a) engaging a protrusion on the left leg in one hole of a plurality of through holes in the left support frame; and b) engaging a protrusion on the right leg in one hole of a plurality of through holes in the right support frame. The method may further include thereafter the user disposing elbows in recesses in the left and right platforms, respectively. The method may further include thereafter disconnecting the support device from the seat and returning the arm support device to the collapsed configuration.

In one or more embodiments, the invention is a collapsible arm support device that is movable between a collapsed configuration and a deployed configuration. The collapsible arm support device includes: a) a left platform moveably connected to a right platform; b) a left support frame pivotally connected to a right support frame and the right platform, with the left support frame having at least one notch on an outboard end thereof, and the right support frame having at least one notch on an outboard end thereof; c) a left leg pivotally mounted to at least one of the left platform and the left support frame; d) a right leg pivotally mounted to at least one of the right platform and the right support frame. In the collapsed configuration: a) the left and right platforms are substantially parallel; b) the left and right support frames are substantially parallel; c) the left leg is substantially parallel to the left platform; d) the right leg is substantially parallel to the right platform. In the deployed configuration: a) the left and right platforms are substantially parallel; b) the left and right support frames are disposed transverse to each other at a non-zero angle; c) the left leg is disposed transverse to the left platform and the left support frame and extends between the left platform and the left support frame so as to space outboard portions of the left platform and the left support frame from each other; d) the right leg is disposed transverse to the right platform and the right support frame and extends between the right platform and the right support frame so as to space outboard portions of the right platform and right support frame from each other.

For some embodiments, in the deployed configuration: a) the left platform, the left support frame, and the left leg form a first right triangle; and b) the right platform, the right support frame, and the right leg form a second right triangle. The left and right legs may be fixed in length, or variable in length. The left and right platforms may advantageously include recesses in their outboard sections, which may be shallow depressions, or through holes. The left support frame may advantageously pivotally connect to the right support frame at a hinge assembly, such that, in the deployed configuration, the left and right support frames define an open space therebetween such that the left and right support frames are not connected to each other except through a hinge assembly. The hinge assembly may include a hinge frame and first, second, and third distinct pivot axes that are spaced from each other. The left and right support frames may pivot about the first pivot axis; the left platform may pivot about the second pivot axis; and the right platform may pivot about the third pivot axis.

For some embodiments, the left and right support frames are configured such that the right support frame rotates relative to the left support frame through an arc greater than 90° when the device is changed from the collapsed configuration to the deployed configuration. In other embodiments, the arc may be less than 90°.

Advantageously, the left support frame has two notches on the outboard end thereof spaced from each other, and the right support frame has two notches on the outboard end thereof spaced from each other. Further, the left support frame may include a grip pad forming an outboard face of the notch in the left support frame; likewise, the right support frame may include a grip pad forming an outboard face of the notch in the right support frame. The left and right support frames may each include a plurality of holes therethrough for mating with a corresponding protrusion on the corresponding leg in the deployed configuration. The left support frame may be rotatable relative to the right support frame about a first pivot axis associated with a hinge assembly, with the first pivot axis disposed equidistant from outermost tips of the left and right platforms with the device in the deployed configuration. A linear distance between outboard tips of the left and right support frames may be variable with the device in the deployed configuration. Further, the left and right platforms are advantageously substantially planar.

The various aspects discussed above may be used alone or in any combination. The various apparatus disclosed herein may operate according to any combination of various methods disclosed herein, and vice versa. Further, the present invention is not limited to the above features and advantages. Indeed, those skilled in the art will recognize additional features and advantages upon reading the following detailed description, and upon viewing the accompanying drawings.

DETAILED DESCRIPTION

The present application is directed to a collapsible arm support device and/or method of operating the same. The arm support device is changeable between a collapsed configuration and a deployed (expanded) configuration. The device, when placed between arms 5 of a seat and in the deployed configuration, provides a comfortable and convenient support for the user's arms.

Figure 1:
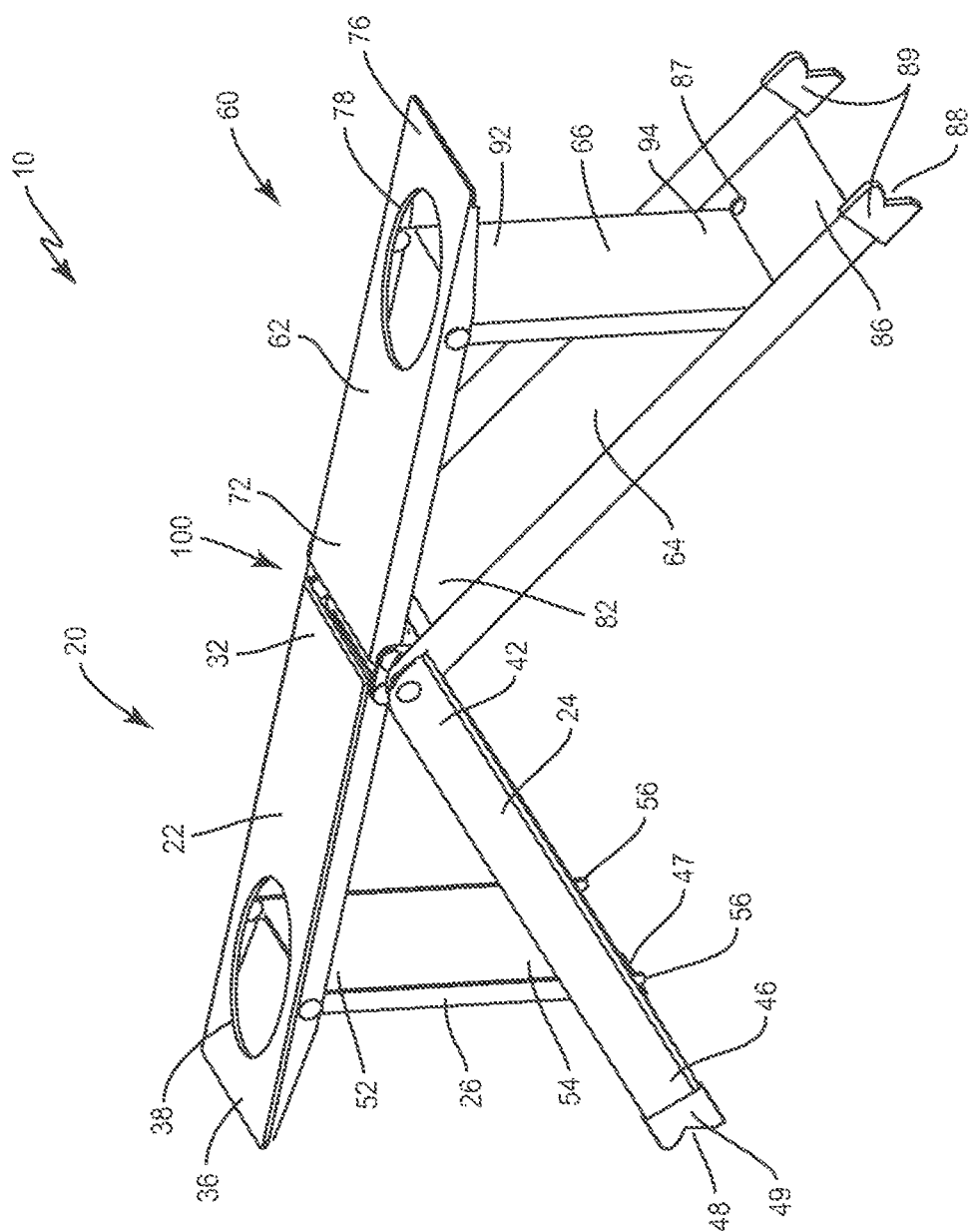
FIG. 1 shows a perspective view of an arm support device according to one or more embodiments of the present invention, in a deployed configuration.
Figure 2:
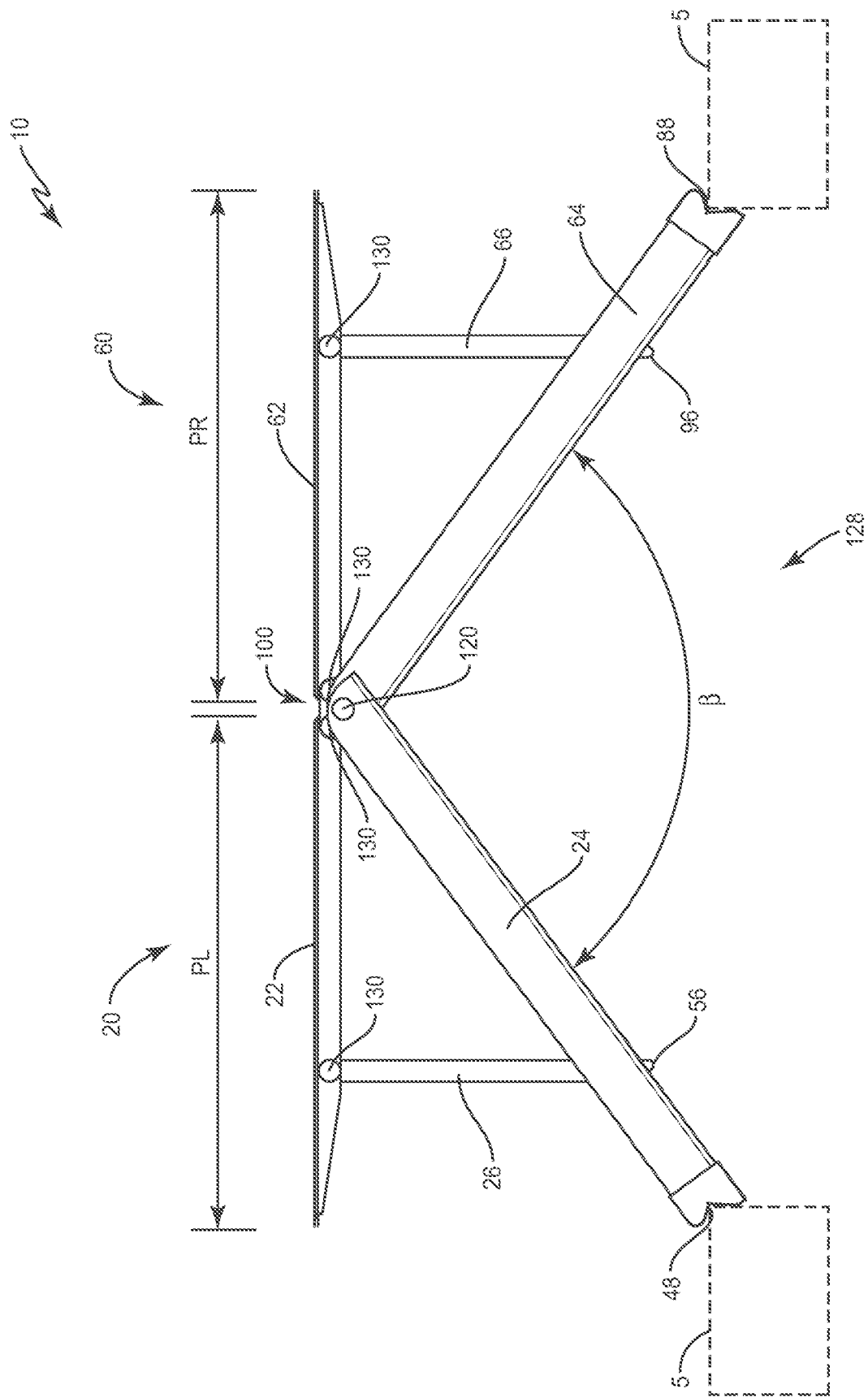
FIG. 2 shows a side view of the device of FIG. 1, in a deployed configuration.
Figure 3:
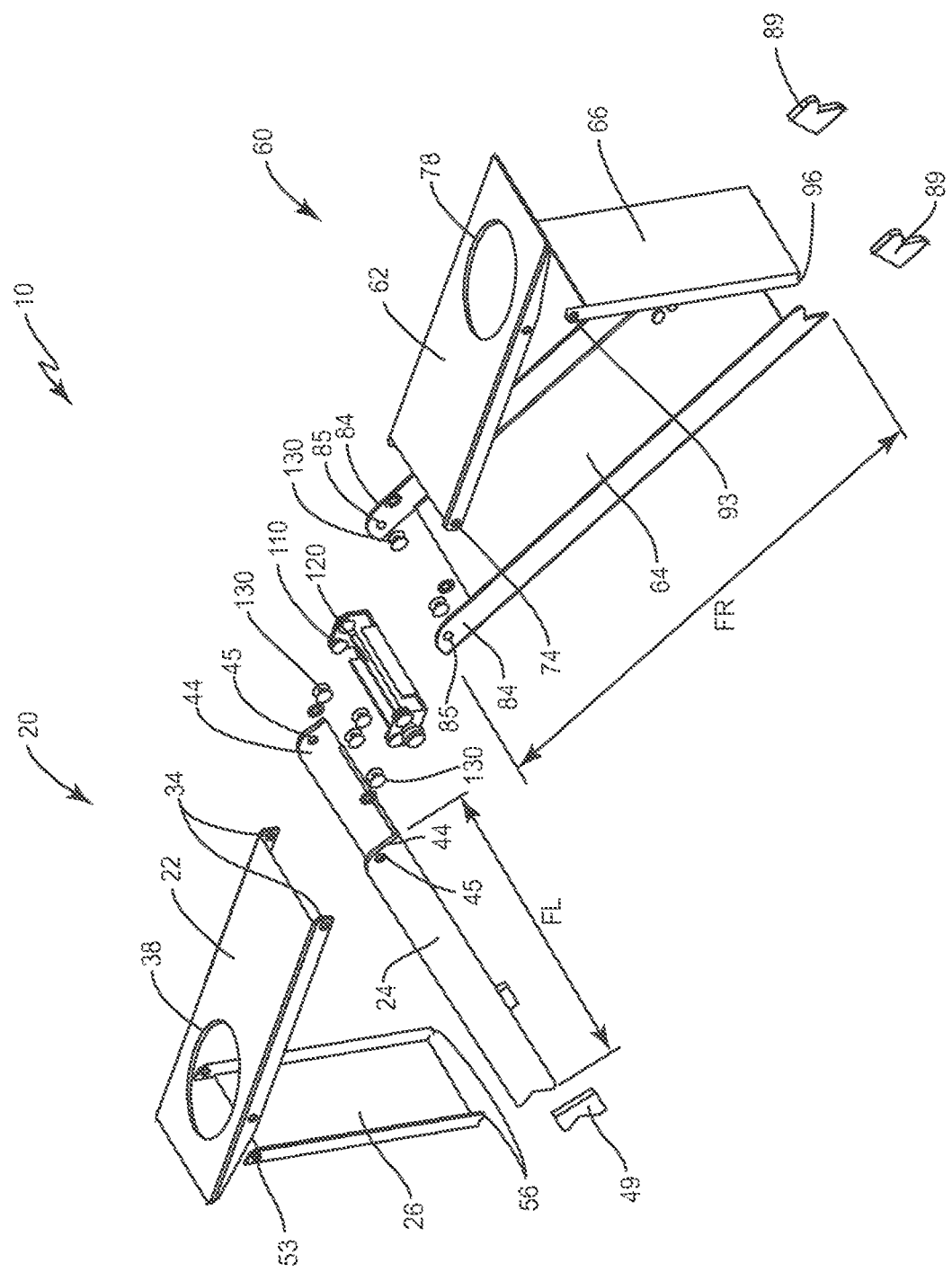
FIG. 3 shows a partially exploded view of the device of FIG. 1, in a deployed configuration, with some parts (e.g., fasteners) omitted for clarity.
Figure 4:
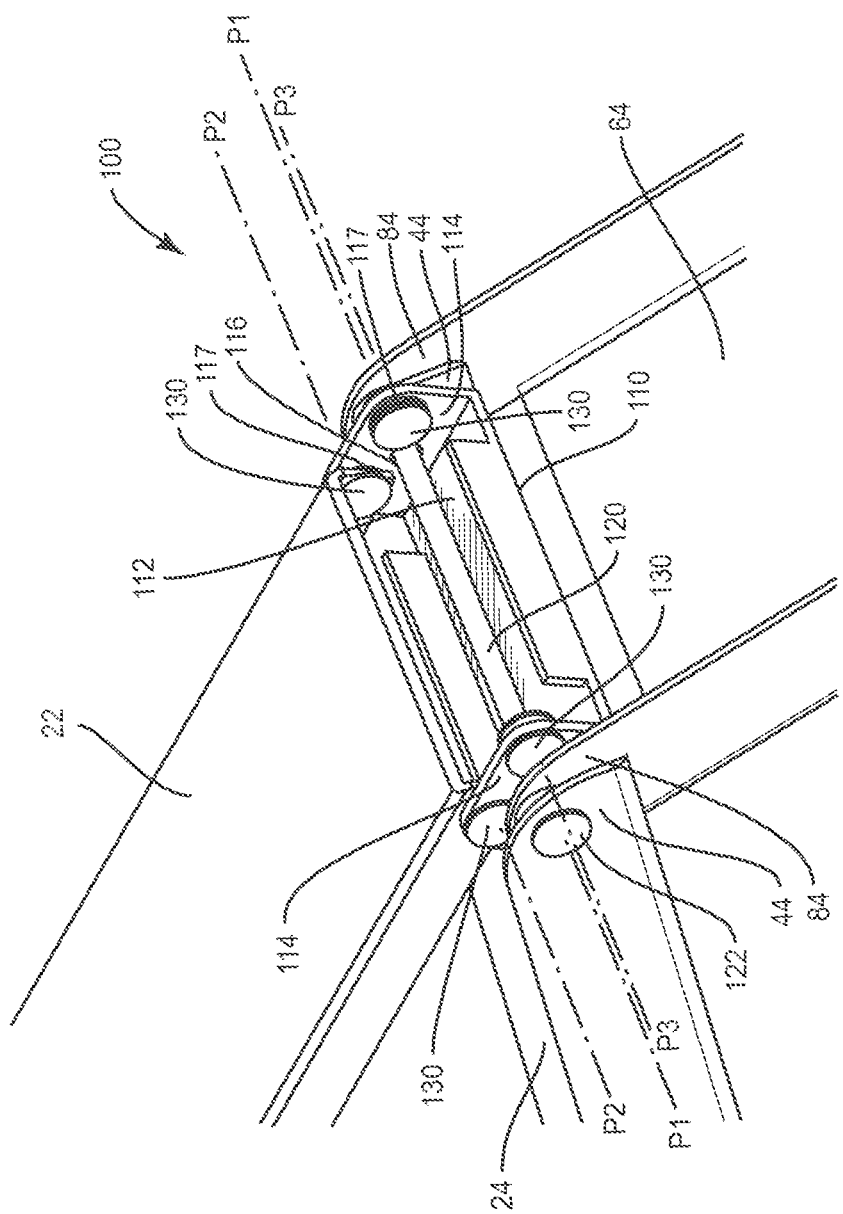
FIG. 4 shows a more detailed view of a hinge assembly of FIG. 2, with some parts (e.g., the right platform) omitted for clarity.
Figure 5:
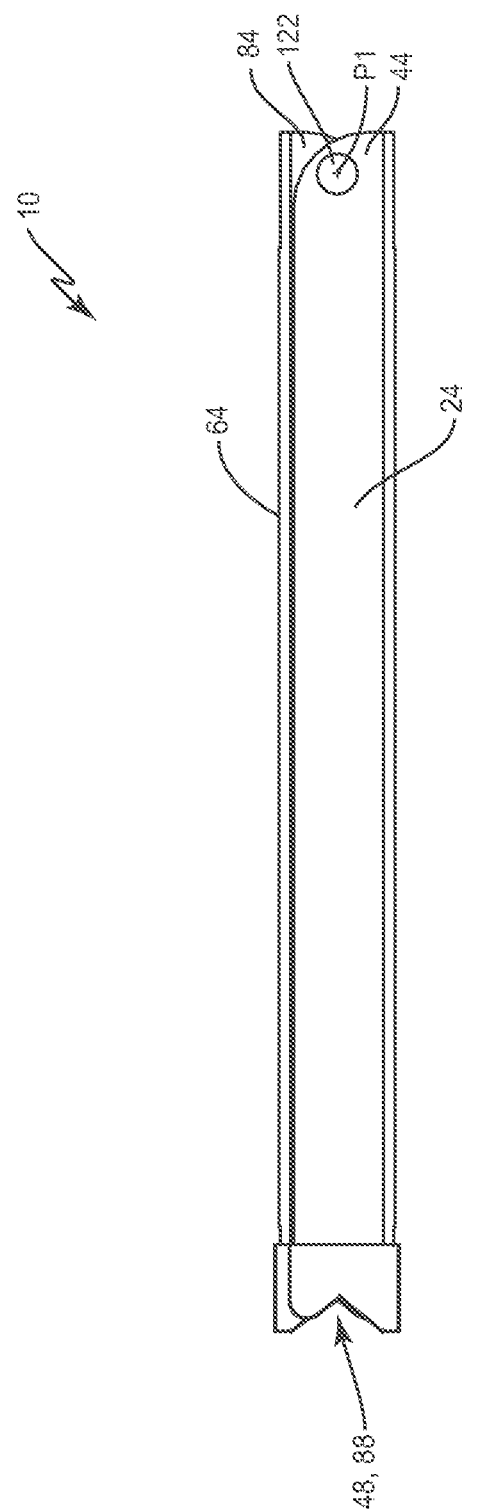
FIG. 5 shows a side view the device of FIG. 1, in the collapsed configuration.
Figure 6:
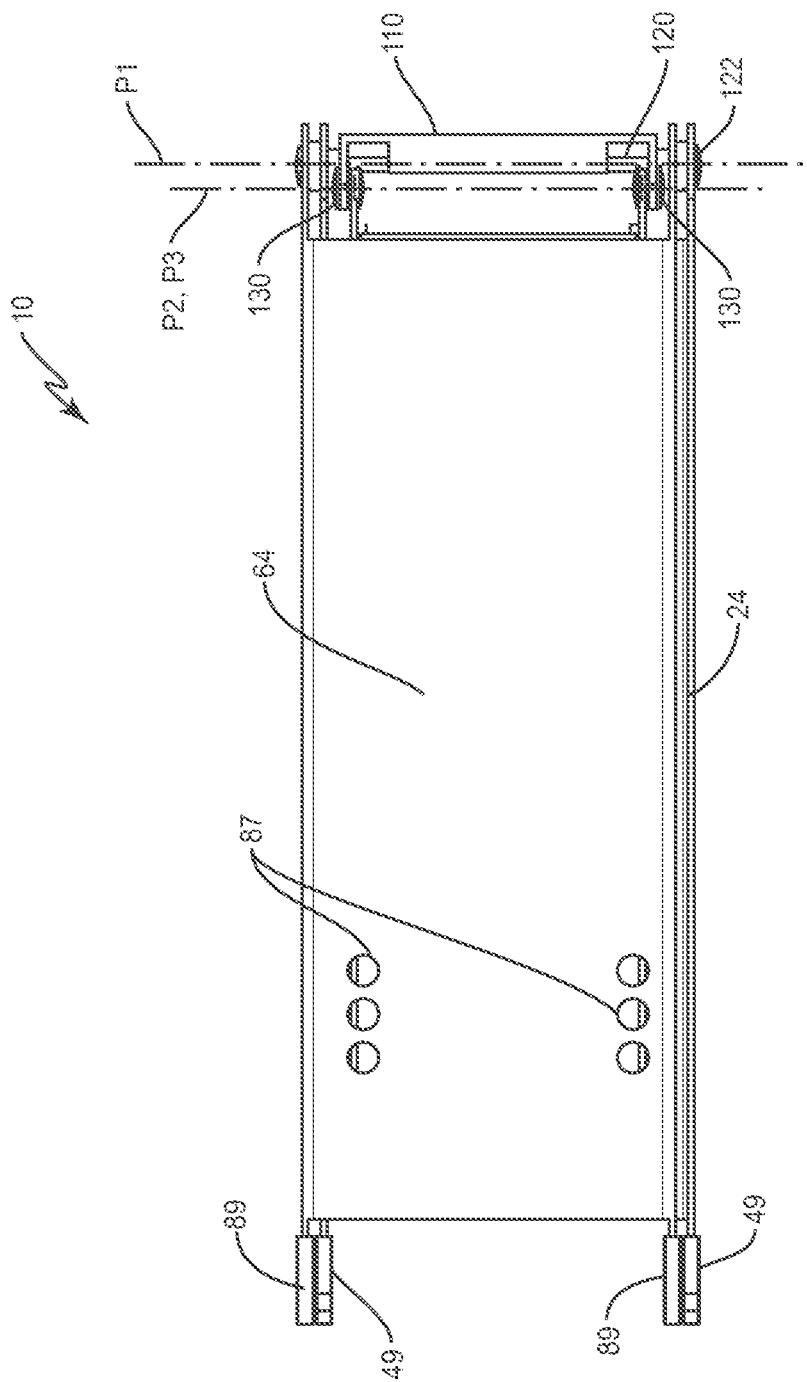
FIG. 6 shows a front view of the device of FIG. 1, in the collapsed configuration.

One embodiment of the collapsible arm support device is shown in FIGS. 1-4, and generally indicated at 10. The device 10 includes a left assembly 20, a right assembly 60, and a hinge assembly 100. The left assembly 20 includes a left platform 22, a left support frame 24, and a left leg 26. The left platform 22 includes an inboard section 32 and an outboard section 36. The inboard section 32 includes suitable means for pivotally mating with the hinge assembly 100, such as the two short flanges shown with pivot holes 34 therein for receiving fasteners 130. The outboard section 36 is advantageously tapered and optionally includes a recess 38 in an elbow rest zone. This recess 38 may take the form of a simple concave indention, or may be a through hole as illustrated. If the recess 38 is a through hole, the perimeter edge of the through hole 38 is advantageously contoured to remove any sharp edges. The left platform 22 has a length PL and is advantageously substantially planar. In this context, substantially means within about ten degrees of being strictly planar. While the left platform 22 is shown as being formed by an inverted channel, such is not required in all embodiments. Indeed, the left platform 22 could alternatively take the form of a generally rectangular block of material, which may be solid and/or hollow in places, as is desired. The upper surface of the left platform 22 is shown as being a contiguous surface, and this surface may be unadorned or may include any suitable indicia (e.g., logos, etc.) printed or formed thereon, as is desired.

The left support frame 24 includes a proximal section 42 and a distal section 46. In the deployed configuration (FIG. 1), the distal section 46 is disposed outboard of the proximal section 42. Thus, the terms proximal and distal, when used in relation to the left support frame 24 (or the right support frame 64 discussed below) are in relation to the pivot axis P1 about which the support frame 24,64 is mounted relative to the remainder of the device 10. The proximal section 42 includes suitable proximally extending mounting flanges 44 having pivot holes 45 therein for receiving fasteners 130. The distal section 46 includes one or more notches 48 on an end thereof. In the illustrated embodiment, the distal section 46 includes two such notches 48 that are located in spaced relation to each other. These notches 48 may be formed on corresponding distally extending flanges, as is desired. The left support frame 24 may include suitable grip pads 49 that form the notches 48, although such is not required. The left support frame 24 has a length FL and is advantageously substantially planar. While the left support frame 24 is shown as being formed by a channel, such is not required in all embodiments. Indeed, the left support frame 24 could alternatively take the form of a generally rectangular block of material, which may be solid and/or hollow in places, as is desired. Similar to the left platform 22, the left support frame 24 may have any suitable indicia (e.g., logos, etc.) printed or formed thereon, as is desired.

The left leg 26 is pivotally mounted to the left platform 22. The upper section 52 of the left leg 26, nearer the left platform 22, may include suitable flange(s) with holes 53 therein for pivotally mounting the left leg 26 to the left platform 22 via fasteners 130. Advantageously, the left leg 26 is approximately as thick as underside recess formed by the left platform 22, so that the left leg 26 can be fully or mostly fully received into the left platform 22 when the device 10 is collapsed. The lower section 54 of the left leg 26 includes one or more feet or protuberances 56 whose function is described below.

The right assembly 60 is pivotally connected to the left assembly 20 at hinge assembly 100. The right assembly 60 is advantageously substantially a mirror image, about pivot axis P1, of the left assembly 20. As such, the right assembly 60 includes a right platform 62, a right support frame 64, and a right leg 66. The right platform 62 includes an inboard section 72 and an outboard section 76. The inboard section 72 includes suitable means for pivotally mating with the hinge assembly 100, such as the two short flanges shown with pivot holes 74 therein for receiving fasteners 130. The outboard section 76 is advantageously tapered and optionally includes a recess 78 in an elbow rest zone. As with recess 38, this recess 78 may take the form of a simple concave indention, or may be a through hole as illustrated. The right platform 62 has a length PR and is advantageously substantially planar. Length PL and length PR are advantageously the same. As with left platform 22, while the right platform 62 is shown as being formed by an inverted channel, such is not required in all embodiments. Indeed, the right platform 62 could alternatively take the form of a generally rectangular block of material, which may be solid and/or hollow in places, as is desired. The upper surface of the right platform 62 is shown as being a contiguous surface, and this surface may be unadorned or may include any suitable indicia (e.g., logos, etc.) printed or formed thereon, as is desired.

The right support frame 64 includes a proximal section 82 and a distal section 86. The proximal section 82 includes suitable proximally extending mounting flanges 84 having pivot holes 85 therein for receiving fasteners 130. The distal section 86 includes one or more notches 88 on an end thereof. In the illustrated embodiment, the distal section 86 includes two such notches 88 that are located in spaced relation to each other. These notches 88 may be formed on corresponding distally extending flanges, as is desired. The right support frame 64 may include suitable grip pads 89 that form the notches 88, although such is not required. The right support frame 64 has a length FR and is advantageously substantially planar. The length FL and length FR are advantageously the same. While the right support frame 64 is shown as being formed by a channel, such is not required in all embodiments. As with the left support frame 24, the right support frame 64 could alternatively take the form of a generally rectangular block of material, which may be solid and/or hollow in places, as is desired. Similar to the left support frame 24, the right support frame 64 may have any suitable indicia (e.g., logos, etc.) printed or formed thereon, as is desired.

The right leg 66 is pivotally mounted to the right platform 62. The upper section 92 of the right leg 66, nearer the right platform 62, may include suitable flange(s) with holes 93 therein for pivotally mounting the right leg 66 to the right platform 62 via fasteners 130. Advantageously, the right leg 66 is approximately as thick as underside recess formed by the right platform 62, so that the right leg 66 and be fully or mostly fully received into the right platform 62 when the device 10 is collapsed. The lower section 94 of the right leg 66 includes one or more feet or protuberances 96 whose function is described below.

The hinge assembly 100 helps pivotally connect the left assembly 20 to the right assembly 60. The hinge assembly 100 may include a hinge frame 110 and a hinge pin 120. The hinge frame 110 may include a base 112 with upwardly extending end flanges 114. The end flanges 114 include three holes 116,117 therethrough that are spaced from each other. Relatively centrally located are holes 116, along central pivot axis P1, for receiving the hinge pin 120. Disposed on either side thereof, advantageously symmetrically, are holes 117 for pivotally mounting the left and right platforms 22,62 via suitable fasteners 130 along pivot axis P2 and pivot axis P3, respectively. Hinge pin 120 extends through hinge frame 110 and advantageously includes an enlarged head 122 on each end, which may be integral with the hinge pin 110 or mounted thereto. For the illustrated embodiment, the mounting flanges 44,84 of the left support frame 24 and the right support frame 64 are captured between the corresponding enlarged head 110 and the corresponding end flange 114.

As discussed above, the left assembly 20 and right assembly 60 are pivotally mounted to each other so that the device 10 may be changed from a collapsed configuration (FIG. 4) to a deployed configuration (FIG. 1) and back again. In the collapsed configuration, the right assembly 60 is folded onto the left assembly 20 so as to have a compact overall footprint. In the collapsed configuration, the left and right platforms 22,62 are substantially parallel to each other, and the left and right support frames 24,64 are substantially parallel to each other, and the left and right legs 26,66 are substantially parallel to their respective platforms 22,62. For the illustrated embodiment, the "underside" of the left and right support frames 24,64 form the outermost surfaces of the device 10 in the collapsed configuration. This collapsed configuration help minimize the space consumed by the device 10 for storage and (non-use) transport.

The user may open the device 10 to the deployed configuration (FIG. 1) by rotating the right assembly 60 relative to the left assembly 20. For the illustrated embodiment, this involves rotating the left support frame 24 more than 180° relative to the right support frame 64, so that the left support frame 24 and the right support frame 64 are transverse to each other and a non-zero angle $\beta$ is formed therebetween. This angle $\beta$ may take on a suitable value, such as approximately 60° to approximately 120°. The left and right platforms 22,62 are rotated about their respective pivot axis relative to the support frames 24,64 so as to be advantageously disposed substantially parallel to each other, but in basically sequential fashion rather than the folded fashion of the collapsed configuration. The left leg 26 is the rotated relative to the left platform 22 so that the left leg 26 extends between the left platform 22 and the left support frame 24 and spaces the outboard section 36 of the left platform 22 from the distal section 46 of the left support frame 24. Likewise, the right leg 66 is rotated relative to the right platform 62 so that the right leg 66 extends between the right platform 62 and the right support frame 64 and spaces the outboard section 76 of the right platform 62 from the distal section 86 of the right support frame 64. Thus, in the deployed configuration, the left platform 22, the left support frame 24, and the left leg 26 jointly form a triangle, and the right platform 62, the right support frame 64, and the right leg 66 jointly form another triangle. These triangles may advantageously be right triangles, but are not required to be.

In order to properly support the left platform 22, the ends of the support frames 24,64 and the relative positions of the legs 26,66 should be held in position. It is intended that the notches on 48,88 the support frames 24,64 be engaged against the arms 5 of the seat, so that a distance between the notch 48 on the left support frame 24 and the notch 88 on the right support frame 64 is maintained. Note that this distance may be variable to accommodate various widths between seat arms 5, but that the distance is relatively fixed when the device is braced against a given pair of seat arms. To releasably hold the left leg 26 in place, each protuberance 56 on the left leg 26 is designed to fit in one of a corresponding series of through holes 47 in the left support frame 24. When the protuberance 56 is in the corresponding hole 47, the minimum distance between the outboard section 36 of the left platform 22 and the distal section 46 of the left support frame 24 is defined by the left leg 26. Similarly, to releasably hold the right leg 66 in place, each protuberance 96 on the right leg 66 is designed to fit in one of a corresponding series of through holes 87 in the right support frame 64. When the protuberance 96 is in the corresponding hole 87, the minimum distance between the outboard section 76 of the right platform 62 and the distal section 86 of the right support frame 64 is defined by the right leg 66. A series of holes 47,87 are provided so that the angle of the platforms 22,62 may be adjusted as desired, especially to accommodate variations in seat arm spacing. Advantageously, the seat arm spacing accommodated by the device 10 is in the range of about seventeen inches to about nineteen inches.

The device 10 is braced against the arms of the seat by engaging the seat arms in the notches 48,88. This establishes a temporarily fixed distance between the ends of the support frames 24,64, and therefore helps determine the angle β between the support frames 24,64. The legs 26,66 are then adjusted to the achieve the desired relative angle of the platforms 22,62, such as substantially parallel (i.e., ±5°) to each other. As discussed above, the adjustment of the legs 26,66 may involve moving their protuberances 56,96 from one hole 47,87 to another until the desired relative angle is achieved. The user may then rest their arms on the platforms 22,62. For example, the user may rest their elbows in the recesses 38,78. The force (e.g., weight) from the user's left arm is transmitted from the left platform 22 to the left support frame 24 by the left leg 26, and likewise with the right arm and right assembly 60. The user may also rest their forearms against the platforms 22,62, and optionally rest their head on their forearms. Using an airline flight as an example, when the flight is nearing landing, the user may disengage the device 10 from the seat arms, and fold the device 10 back into the collapsed configuration (FIG. 4) for storage, etc.

It should be noted that the device 10 does not include a retaining chain or cord that extends between the left and right support frames 24,64 in the deployed configuration. Instead, the left and right support frames 24,64 define an open space 128 that is free of obstructions. Thus, the left and right support frames 24,64 are not connected to each other except through hinge assembly 100. The defined open space 128 allows the device 10 to fit over the user's lower body (e.g., lower torso and legs 26,66) so that the device 10 advantageously does not rest on the user's lower body, but instead rests on the arms of the seat.

As discussed above, the distance between the notches 48,88 should be in the range of about seventeen inches to nineteen inches, in the deployed configuration. Advantageously, the combined length of the left and right platforms 22,66 (plus the distance between axis P2 and axis P3) is approximately in the same range, or just slightly less, so that the platforms, when in the deployed configuration, extend across substantially the width between the seat arms, but do not extend beyond that so as to not intrude on the adjoining seat.

In some embodiments, padding may be added to the device 10, either permanently or removably. For example, a cushioned pad may optionally be placed over the platforms 22,62 with pockets on the pad sliding over the distal ends of the platforms 22,62. Such padding may increase user comfort, and allow for easy customization of logos and the like.

The discussion above has assumed that the device 10 has fixed length legs 26,66. However, in some embodiments, the legs 26,66 may have a variable length, such as by including a screw-type telescoping feature, or other variable length feature known in the mechanical arts. Likewise, while the discussion above has been in the context of the legs 26,66 being pivotally mounted at the platforms 22,62, alternative embodiments may have the legs 26,66 pivotally mounted at the support frames 24,64 instead. Further, while the pivoting connections illustrated herein have certain male/female relationships, one of skill in the art will recognize that any or all of these relationships may have a reverse male/female relationship relative to what is illustrated.

In addition, the discussion above has assumed that holes 47,87 are used to mate with protuberances 56,96 in order to lock the legs 26,66 relative to the support frames 24,64 in the deployed configuration. However, other means may alternatively and/or additionally be used, such as one or more teeth on one or both of the engaging elements, built-in bosses, snap-fit arrangements, and the like.

The discussion above has generally been in the context of the hinge assembly 100 connecting the left and right support frames 24,64 having at least a hinge frame 110 and hinge pin 120. However, in some embodiments the hinge assembly 100 may consist of simply a hinge pin 120 (or other hinge mechanism known in the art) without a hinge frame 110. Such an embodiment may, for example, have the hinge pin 120 connect the left and right support frames 24,64, with the left and right platforms 22,62 being pivotally connected to their respective support frames 24,64.

In the illustrated embodiment, the left and right support frames 24,64 jointly sweep an arc of more than 180° when changing from the deployed configuration to the collapsed configuration. Thus, the left and right support frames 24,64 may be said to fold back on themselves when moving from the deployed configuration to the collapsed configuration. However, in other embodiments, the left and right support frames 24,64 may sweep an arc of less than 180°, such as between 90° and 180° when changing from the deployed configuration to the collapsed configuration. In these embodiments, the left and right support frames 24,64 may be said to fold forward on themselves when moving from the deployed configuration to the collapsed configuration.

The various components of the device 10 may be made from any suitable material or combination of materials, such as aluminum, titanium, steel, various polymers such as high density polyethylene or ABS, carbon or other fiber reinforced polymers/resins, and the like. And, any suitable fabrication techniques, or combination of techniques, may be used, such as bending, milling, roll forming, injection or blow molding, extrusion, plastic printing, etc.

The disclosure of all patents and patent publications mentioned above are incorporated herein by reference in their entirety.

The present invention may, of course, be carried out in other specific ways than those herein set forth without departing from the scope of the invention. The present embodiments are, therefore, to be considered as illustrative and not restrictive.

What is claimed is:

1. A method of providing an arm rest, comprising:
changing a collapsible arm support device from a collapsed configuration to a deployed configuration;
thereafter, releasably bracing the arm support device against left and right arms of a seat;
wherein the arm support device comprises:
 a left platform moveably connected to a right platform;
 a left support frame moveably connected to a right support frame, the left and right support frames each having at least one notch on an outboard end thereof;
 a left leg pivotally mounted to at least one of the left platform and the left support frame;
 a right leg pivotally mounted to at least one of the right platform and the right support frame;
wherein, in the collapsed configuration:
 the left and right platforms are substantially parallel;

the left and right support frames are substantially parallel;
the left leg is substantially parallel to the left platform;
the right leg is substantially parallel to the right platform;
wherein, in the deployed configuration:
the left and right platforms are substantially parallel;
the left and right support frames are disposed transverse to each other at a non-zero angle;
the left leg is disposed transverse to the left platform and the left support frame and extends between the left platform and the left support frame so as to space outboard portions of the left platform and the left support frame from each other;
the right leg is disposed transverse to the right platform and the right support frame and extends between the right platform and the right support frame so as to space outboard portions of the right platform and right support frame from each other;
wherein the bracing the arm support device comprises engaging the notches of the left and right support frame against the left and right arms, respectively.

2. The method of claim 1, wherein the changing the collapsible arm support device from the collapsed configuration to the deployed configuration comprises rotating the right support frame relative to the left support frame through an arc greater than 90°.

3. The method of claim 1:
wherein the left support frame has two notches on the outboard end thereof spaced from each other;
wherein the right support frame has two notches on the outboard end thereof spaced from each other;
wherein the bracing the arm support device comprises:
engaging the two notches of the left support frame against the left arms of the seat; and
engaging the two notches of the right support frame against the right arms of the seat.

4. The method of claim 1, wherein the changing the collapsible arm support device from the collapsed configuration to the deployed configuration comprises:
engaging a protrusion on the left leg in one hole of a plurality of through holes in the left support frame; and
engaging a protrusion on the right leg in one hole of a plurality of through holes in the right support frame.

5. The method of claim 1, further comprising thereafter disposing elbows in recesses in the left and right platforms, respectively.

6. The method of claim 1, further comprising thereafter disconnecting the support device from the seat and returning the arm support device to the collapsed configuration.

7. A collapsible arm support device, comprising:
a left platform moveably connected to a right platform;
a left support frame pivotally connected to a right support frame and the right platform;
wherein the left support frame has at least one notch on an outboard end thereof;
wherein the right support frame has at least one notch on an outboard end thereof;
a left leg pivotally mounted to at least one of the left platform and the left support frame;
a right leg pivotally mounted to at least one of the right platform and the right support frame;
wherein the arm support device is movable between a collapsed configuration and a deployed configuration;
wherein, in the collapsed configuration:
the left and right platforms are substantially parallel;
the left and right support frames are substantially parallel;
the left leg is substantially parallel to the left platform;
the right leg is substantially parallel to the right platform;
wherein, in the deployed configuration:
the left and right platforms are substantially parallel;
the left and right support frames are disposed transverse to each other at a non-zero angle;
the left leg is disposed transverse to the left platform and the left support frame and extends between the left platform and the left support frame so as to space outboard portions of the left platform and the left support frame from each other;
the right leg is disposed transverse to the right platform and the right support frame and extends between the right platform and the right support frame so as to space outboard portions of the right platform and right support frame from each other;
the left support frame comprises a grip pad forming an outboard face of the notch in the left support frame;
the right support frame comprises a grip pad forming an outboard face of the notch in the right support frame.

8. The device of claim 7, wherein, in the deployed configuration:
the left platform, the left support frame, and the left leg form a first triangle;
the right platform, the right support frame, and the right leg form a second triangle;
wherein the first and second triangles are right triangles.

9. The device of claim 7, wherein the left and right legs are fixed in length.

10. The device of claim 7:
wherein the left platform includes a first recess in an outboard section thereof;
wherein the right platform includes a second recess in an outboard section thereof.

11. The device of claim 10, wherein the first and second recesses are through holes.

12. The device of claim 7:
wherein the left support frame is pivotally connected to the right support frame at a hinge assembly;
wherein, in the deployed configuration, the left and right support frames define an open space therebetween such that the left and right support frames are not connected to each other except through hinge assembly.

13. The device of claim 7, wherein the left and right platforms are substantially planar.

14. The device of claim 7:
wherein the left support frame comprises a plurality of holes therethrough and the left leg includes a protrusion configured to be received in the holes of the left support frame when the device is in the deployed configuration;
wherein the right support frame comprises a plurality of holes therethrough and the right leg includes a protrusion configured to be received in the holes of the right support frame when the device is in the deployed configuration.

15. The device of claim 7:
wherein the left support frame is rotatable relative to the right support frame about a first pivot axis associated with a hinge assembly;
wherein the first pivot axis is disposed equidistant from outermost tips of the left and right platforms with the device in the deployed configuration.

16. A collapsible arm support device, comprising:
a left platform moveably connected to a right platform;
a left support frame pivotally connected to a right support frame and the right platform;

wherein the left support frame has at least one notch on an outboard end thereof;
wherein the right support frame has at least one notch on an outboard end thereof;
a left leg pivotally mounted to at least one of the left platform and the left support frame;
a right leg pivotally mounted to at least one of the right platform and the right support frame;
wherein the arm support device is movable between a collapsed configuration and a deployed configuration;
wherein, in the collapsed configuration:
the left and right platforms are substantially parallel;
the left and right support frames are substantially parallel;
the left leg is substantially parallel to the left platform;
the right leg is substantially parallel to the right platform;
wherein, in the deployed configuration:
the left and right platforms are substantially parallel;
the left and right support frames are disposed transverse to each other at a non-zero angle;
the left leg is disposed transverse to the left platform and the left support frame and extends between the left platform and the left support frame so as to space outboard portions of the left platform and the left support frame from each other;
the right leg is disposed transverse to the right platform and the right support frame and extends between the right platform and the right support frame so as to space outboard portions of the right platform and right support frame from each other;
wherein the left support frame is pivotally connected to the right support frame at a hinge assembly;
wherein, in the deployed configuration, the left and right support frames define an open space therebetween such that the left and right support frames are not connected to each other except through hinge assembly;
wherein the hinge assembly comprises a hinge frame and first, second, and third distinct pivot axes that are spaced from each other;
wherein the left and right support frames pivot about the first pivot axis;
wherein the left platform pivots about the second pivot axis;
wherein the right platform pivots about the third pivot axis.

17. A collapsible arm support device, comprising:
a left platform moveably connected to a right platform;
a left support frame pivotally connected to a right support frame and the right platform;
wherein the left support frame has at least one notch on an outboard end thereof;
wherein the right support frame has at least one notch on an outboard end thereof;
a left leg pivotally mounted to at least one of the left platform and the left support frame;
a right leg pivotally mounted to at least one of the right platform and the right support frame;
wherein the arm support device is movable between a collapsed configuration and a deployed configuration;
wherein, in the collapsed configuration:
the left and right platforms are substantially parallel;
the left and right support frames are substantially parallel;
the left leg is substantially parallel to the left platform;
the right leg is substantially parallel to the right platform;
wherein, in the deployed configuration:
the left and right platforms are substantially parallel;
the left and right support frames are disposed transverse to each other at a non-zero angle;
the left leg is disposed transverse to the left platform and the left support frame and extends between the left platform and the left support frame so as to space outboard portions of the left platform and the left support frame from each other;
the right leg is disposed transverse to the right platform and the right support frame and extends between the right platform and the right support frame so as to space outboard portions of the right platform and right support frame from each other;
wherein the left and right support frames are configured such that the right support frame rotates relative to the left support frame through an arc greater than 90° when the device is changed from the collapsed configuration to the deployed configuration.

18. A collapsible arm support device, comprising:
a left platform moveably connected to a right platform;
a left support frame pivotally connected to a right support frame and the right platform;
wherein the left support frame has at least one notch on an outboard end thereof;
wherein the right support frame has at least one notch on an outboard end thereof;
a left leg pivotally mounted to at least one of the left platform and the left support frame;
a right leg pivotally mounted to at least one of the right platform and the right support frame;
wherein the arm support device is movable between a collapsed configuration and a deployed configuration;
wherein, in the collapsed configuration:
the left and right platforms are substantially parallel;
the left and right support frames are substantially parallel;
the left leg is substantially parallel to the left platform;
the right leg is substantially parallel to the right platform;
wherein, in the deployed configuration:
the left and right platforms are substantially parallel;
the left and right support frames are disposed transverse to each other at a non-zero angle;
the left leg is disposed transverse to the left platform and the left support frame and extends between the left platform and the left support frame so as to space outboard portions of the left platform and the left support frame from each other;
the right leg is disposed transverse to the right platform and the right support frame and extends between the right platform and the right support frame so as to space outboard portions of the right platform and right support frame from each other;
wherein the left support frame has two notches on the outboard end thereof spaced from each other;
wherein the right support frame has two notches on the outboard end thereof spaced from each other.

19. A collapsible arm support device, comprising:
a left platform moveably connected to a right platform;
a left support frame pivotally connected to a right support frame and the right platform;
wherein the left support frame has at least one notch on an outboard end thereof;
wherein the right support frame has at least one notch on an outboard end thereof;
a left leg pivotally mounted to at least one of the left platform and the left support frame;
a right leg pivotally mounted to at least one of the right platform and the right support frame;

wherein the arm support device is movable between a collapsed configuration and a deployed configuration;

wherein, in the collapsed configuration:
- the left and right platforms are substantially parallel;
- the left and right support frames are substantially parallel;
- the left leg is substantially parallel to the left platform;
- the right leg is substantially parallel to the right platform;

wherein, in the deployed configuration:
- the left and right platforms are substantially parallel;
- the left and right support frames are disposed transverse to each other at a non-zero angle;
- the left leg is disposed transverse to the left platform and the left support frame and extends between the left platform and the left support frame so as to space outboard portions of the left platform and the left support frame from each other;
- the right leg is disposed transverse to the right platform and the right support frame and extends between the right platform and the right support frame so as to space outboard portions of the right platform and right support frame from each other;

where a linear distance between outboard tips of the left and right support frames is variable with the device in the deployed configuration.

* * * * *